United States Patent
Sin et al.

(10) Patent No.: US 7,710,574 B2
(45) Date of Patent: May 4, 2010

(54) DEVICES IN MINIATURE FOR INTERFEROMETRIC USE AND FABRICATION THEREOF

(75) Inventors: Jeongsik Sin, Keller, TX (US); Woo Ho Lee, Flower Mound, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 12/009,889

(22) Filed: Jan. 23, 2008

(65) Prior Publication Data

US 2008/0285044 A1   Nov. 20, 2008

Related U.S. Application Data

(60) Provisional application No. 60/881,939, filed on Jan. 23, 2007.

(51) Int. Cl.
*G01J 3/45* (2006.01)
(52) U.S. Cl. ...................................................... 356/452
(58) Field of Classification Search .................. 356/450, 356/451, 452
See application file for complete search history.

(56) References Cited

U.S. PATENT DOCUMENTS

| | | | | |
|---|---|---|---|---|
| 5,909,078 | A * | 6/1999 | Wood et al. | 310/307 |
| 6,255,757 | B1 * | 7/2001 | Dhuler et al. | 310/307 |
| 6,360,539 | B1 * | 3/2002 | Hill et al. | 60/528 |
| 7,025,619 | B2 * | 4/2006 | Tsui et al. | 439/353 |
| 7,359,058 | B2 * | 4/2008 | Kranz et al. | 356/452 |
| 7,411,682 | B2 * | 8/2008 | Moshe | 356/452 |
| 7,511,802 | B2 * | 3/2009 | Smith | 356/72 |
| 2005/0031288 | A1 * | 2/2005 | Kubby et al. | 385/137 |

\* cited by examiner

*Primary Examiner*—Tarifur Chowdhury
*Assistant Examiner*—Jonathan M Hansen
(74) *Attorney, Agent, or Firm*—Chowdhury & Georgakis, PC

(57) ABSTRACT

A device in miniature and fabrication of such a device for interferometric use is described, the device including a substrate with at least one deep reactive ion etching structure on at least one surface of the substrate forming an optical bench. The optical bench preferably comprises a moving stage, an actuator, one or more connector sockets and one or more optical components.

18 Claims, 8 Drawing Sheets

US 7,710,574 B2

DEVICES IN MINIATURE FOR INTERFEROMETRIC USE AND FABRICATION THEREOF

CROSS-REFERENCES TO RELATED APPLICATIONS

This application claims the benefit for priority from U.S. Provisional Application No. 60/881,939 filed Jan. 23, 2007.

BACKGROUND OF THE INVENTION

The invention described relates to the field of electronics and optics, and more specifically to miniaturized electronic devices and fabrication of such a device, such as micro-opto-electro-mechanical systems (MOEMS).

Most current interferometers using a Fourier transform (FT) principle are heavy and bulky. While various microfabrication approaches have been tried in order to create smaller-sized devices, when preparing such a device in miniature, the characteristics of a scanning mirror are challenging (e.g., in terms of stroke, position sensing, and mirror assembly) and have not been suitably met because micro-machined actuators do not generate sufficient stroke and precision position control has not matured sufficiently.

SUMMARY OF THE INVENTION

The invention described solves many current problems associated with the miniaturization of optic devices that are currently heavy and bulky.

Generally, and in one form, is provided a device for interferometric use based on FT assembled in miniature using a micro-machined optical bench that typically comprises an actuator, a lever mechanism, and one or more mirrors. Optical components for the device are assembled from micro-parts, including one or more light sources, detectors, mirrors, beam splitters, ball lens, and combinations thereof.

Those skilled in the art will further appreciate the above-noted features and advantages of the invention together with other important aspects thereof upon reading the detailed description that follows in conjunction with the drawings.

BRIEF DESCRIPTION OF THE DRAWINGS

For more complete understanding of the features and advantages of the present invention, reference is now made to the detailed description of the invention along with the accompanying figures, wherein.

DETAILED DESCRIPTION OF THE INVENTION

Figure 1A:
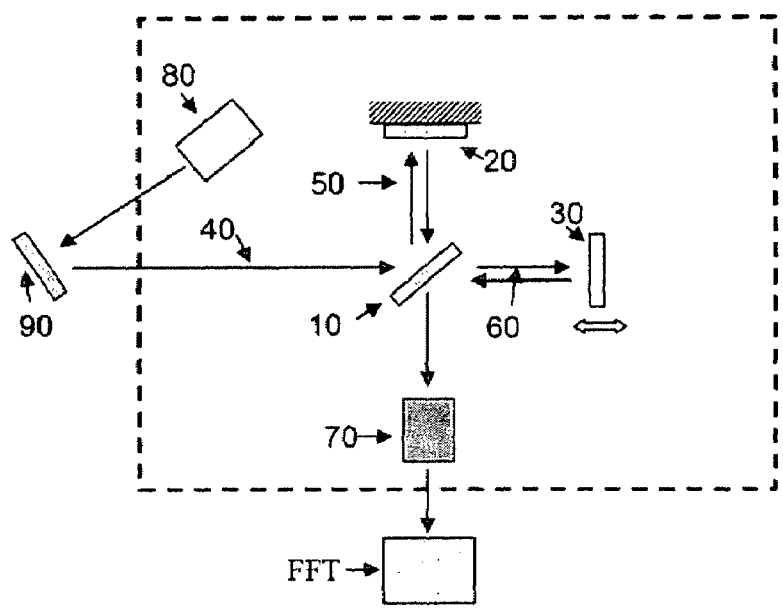
FIGS. 1A-1B depict schematics for (A) a principle layout of an interferometer and (B) a representative layout for a device described herein as fabricated on a substrate.

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts may be marked throughout the specification and drawing with the same reference numerals, respectively. The drawing figures are not necessarily to scale and certain features may be shown exaggerated in scale or in somewhat generalized or schematic form in the interest of clarity and conciseness.

Optical components such as mirrors and a beam splitter that must be machined and assembled into the smaller device are typically problematic due to misalignments from assembly tolerances that then degrade the quality of spectrum. Previously, when preparing a smaller-sized optical device, characteristics of components, such as a scanning mirror have proven very challenging in terms of stroke, position sensing, and mirror assembly because micro-machined actuators do not generate sufficient stroke, in general. Moreover precision position control has not matured due primarily to a lack of sensory information. Such devices, such as interferometers and spectrometers, in miniature have thus proven difficult; those available are bulky and neither economical nor often efficient.

Described herein is a device for interferometric use in miniature that is assembled without such problems as described above yet still providing high spectral resolution. As described herein such improvements and fabrication of such devices that provide miniaturized microsystems with high spectral resolution for identification of materials and chemicals. The miniaturization of the described optical devices allow for new application areas with real-time and on-site measurements.

The principle of a device described herein is Fourier transform and is based on a Michelson interferometer, in which a scanning mirror mechanism is involved in creating an interferogram, and the recorded interferogram is converted to a spectrum by numerical Fourier transform with respect to an optical path difference (OPD). Spectral resolution is determined by a maximum OPD and its accuracy is affected by positioning accuracy of a mirror that produces OPD. For this reason, a high precision and a long stroke are two independent factors that provide improved performance of a scanning mirror in an FT spectrometer described herein.

In general, OPD is a difference between two traveling light paths reflected from fixed and moving mirrors. Each wavelength in an interferometer produces its own characteristic interference pattern as OPD changes. Recording of a detected signal versus an optical path difference is the interferogram; Fourier transform is used to convert the interferogram into a spectrum.

A mathematical interpretation of the principle is described as the superposition of multiple monochromatic, coherent waves of amplitude $$I(x) = \int_0^\infty B(\sigma)\cos(2\pi\sigma x)d\sigma(W) \qquad (1)$$
$$= \frac{1}{2}\int_{-\infty}^\infty B(\sigma)e^{i2\pi\sigma x}d\sigma(W),$$

where, I(x) is a measured interferogram, B(σ) is spectral radiance, σ is wave number, x is optical path difference. A theoretical spectral resolution is defined as $\delta\sigma=1/(2L)$ or resolving power $R=2L/\lambda$. A longer recorded distance (L) achieves a better resolving power. A discrete sampling also imposes sampling condition. To avoid overlapping, a Nyquist sampling condition $$\Delta x \leq \frac{1}{2\sigma_m} = \frac{\lambda_{min}}{2}$$

may be applied.

As shown in FIG. 1A, a Michelson interferometer typically comprises a beam splitter 10, a fixed mirror 20 and a movable mirror 30 that translates very precisely in one dimension (back and forth). A beam 40 of multiple wavelengths projected from source 80 onto sample 90 strikes the beam splitter and separates into two beams 50 and 60. One beam is reflected off the beam splitter to fixed mirror 20 and the other beam is transmitted through beam splitter 10 to moving mirror 30. The fixed and moving mirrors 20 and 30, respectively, reflect the beams back to beam splitter 10. Half of the reflected beam is transmitted and reflected as the same way resulting in one beam passing to a detector 70 and the other beam going back to source 80.

Figure 1B:
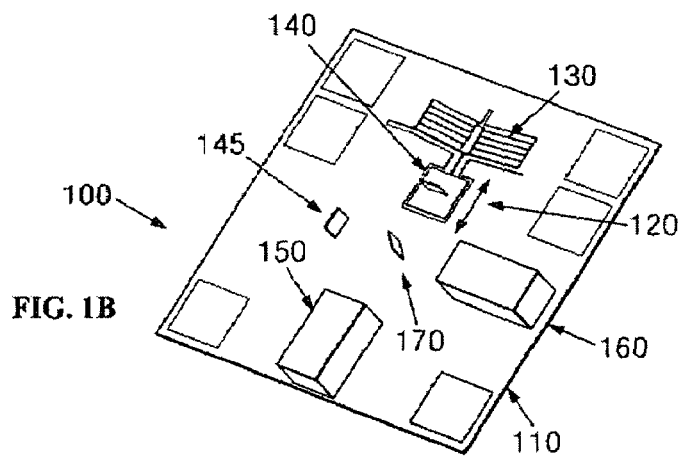

In one or more embodiments, device for interferometric use in miniature is provided herein that adopts a concept of an FT interferometry. A representative schematic is shown in FIG. 1B. The device 100 is micro-machined and provided on a substrate 110, such as a silicon substrate and/or an silicon-on-insulator (SOI) wafer, although similar substrates are suitable for use known to one of skill in the art. Thus, a suitable substrate is a single or multi-layered substrate. When multi-layered, an example of such layers includes silicon on top of an insulating layer on top of additional silicon or an SOI wafer).

An optical bench is provided on the substrate using a DRIE process or other suitable micromachining method to make such a structure as further described. The optical bench typically includes a moving stage 120 driven by one or more actuators 130, such as a thermal or electrothermal actuator or electrostatic actuators, which are used for the scanning motion of one or more mirrors 140. The optical bench also has registration and assembly socket structures (e.g., flexure structures) that facilitate addition and assembly of optical components, such as one or more of the following: light source 150, detector 160, mirrors 140 and 145, and one or more beam splitters 170. Hence, such optical components are typically assembled directly on the miniaturized optical bench.

A microassembly technique is used to provide a device in miniature that, in one or more forms, behaves similar to that of a Fourier transform spectrometer. The microassembly method provides for a self-alignment of a mirror in a socket. Should a slope be formed after DRIE or other such micromachining process, a mirror may slightly tilt after assembly. The exemplified assembly provides a device having micromirrors, a ball lens, and beam splitter selectively positioned on a micro-machined optical bench. The optical bench is further provided with a scanning stage and a number of sockets.

Thus, an optical bench includes several components, such as a moving stage, mechanical assembly socket structures, at least one beam splitter, and one or more assembled mirrors. The moving stage includes an assembly socket where a mirror is picked and placed for positioning. Sockets serve as mating locations for a part; assembly may be reinforced with gluing or soldering and the like. Multiple registration and assembly socket structures of the optical bench further facilitate assembly and alignment of optical components.

When the optical bench is further provided with an actuator (generally having one or more stroke amplification mechanisms), the combination provides amplified scanning motion of a scanning mirror. In one or more embodiments, an actuator is in contact with or embedded in the optical bench and comprises a couple of V-beam shaped structures. The V-beam shape structures respond to heat, such that thermal expansion of V-shaped ribs pull (or push) an embedded actuation bar depending on its configuration. The actuation mechanism may further comprise a comb structure for capacitance measurement. During scanning motion of the stage, a capacitance change from the comb structure may be measured and used for position sensing.

Figure 2B:
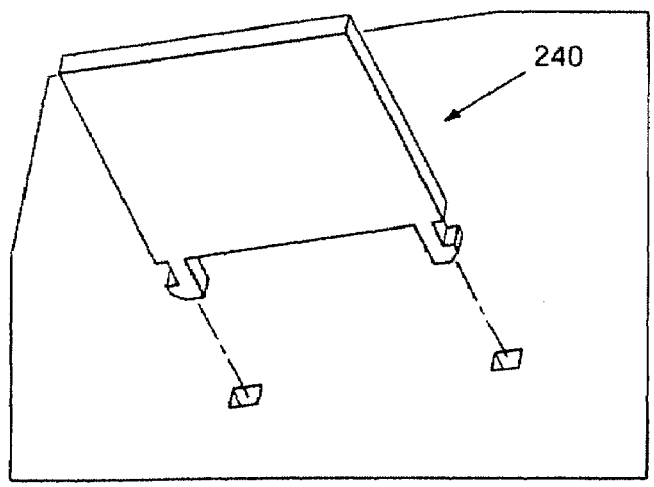
FIGS. 2A-2B depict representative examples of micro-machined components that include (A) a scanning mechanism with a lever mechanism and connector socket for mirror assembly and (B) a representative mirror with a mechanical connector.
Figure 2A:
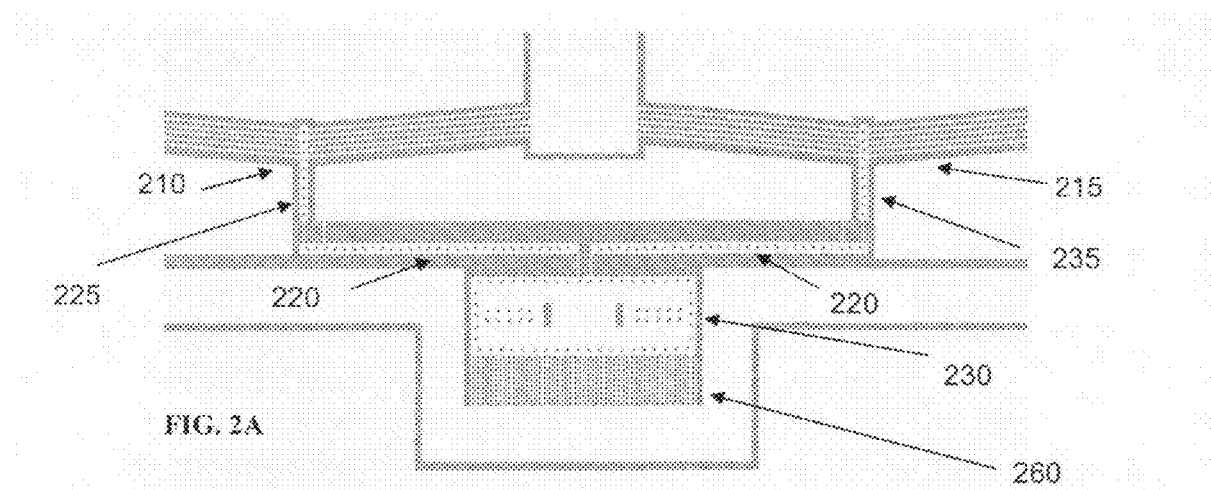

As shown in FIG. 2A, a pair of V-beam shape structures 210 and 215 are used as an electrothermal actuator so that force caused by thermal expansion of such V-shape ribs push (or pull) actuation bar 225 and/or 235. The stroke is amplified by a lever mechanism 220 in contact with an end of actuator 210 and/or 215. Typically a symmetric structure of two actuators (V-beam structures) and two lever mechanism are used to increase driving force and eliminate rotational motion of the stage. A comb structure for capacitance measurement may be further provided near the moving stage having an assembly or connector socket, such as is shown in FIG. 2A at position 260. As further shown in FIG. 2A, a moving stage carries an assembly or at least one connector socket 230 where a mirror is assembled. Sockets are generally female mechanical flexure structures for providing a precise snap-fit assembly, such as with the mirrors. At least one mirror is typically a micromachined silicon mirror.

Example of a micromachined mirrors is shown in FIG. 2B, which is typically micro-machined by DRIE. In one or more embodiments, a microassembly method is implemented to self-align a mirror in a socket of the optical bench. A micro-machined mirror may be polished silicon, which is useful due its high reflectivity in the visual wavelength range and does not require coating on the surface. Mirrors of the device described may be stationary and scanning.

In several embodiments, one or more mirrors are fabricated by a micromachining method, such as DRIE, and a metal deposition process.

A suitable dimension for an optical bench is about 1 cm². A beam length of a V-beam structure of an embedded thermal actuator is typically about 1 mm. A suitable mirror may have a reflection area of about 1×1 mm² and one or more flexure structures for pick and place assembly. Other reflective areas (e.g., arrays) are possible and may be desired as needed. A flexure structure is provided for a large deflection so that a microgripper can pick up the mirror by inserting the gripper tip into the flexure structure, followed by snap-fitting it into a mechanical socket of the optical bench. In an optical bench having a dimension of about 1 cm², flexure structures may be at or about 500-1000 μm long. Typically several flexure structures are positioned at one or more locations, such as those embodied in FIG. 1B as 130, 140, 145, 150 and 160.

A light source may be optionally provided with a device described herein. A detector is used to measure light power with respect to input voltage. The relationship between light power changes versus displacement of a scanning mirror represents an interferogram.

Assembly of a device in miniature implements a miniaturized snap connector mechanism to reduce uncertainties and lack of sensory feedback information. The snap connector mechanism joins one or more parts to the optical bench, such as mirrors. An example of an assembly method includes using a force-fit assembly for high precision self-alignment.

A micro-machined passive gripper as exemplified in FIG. 2B and one or more mirrors with mechanical connector (flexure) structure 240 (as exemplified in FIGS. 2C and 2D) are so designed in order that the passive microgripper may pick up the mirror by inserting a gripper tip into or onto structure 240.

A microgripper positions a mirror onto a connector socket of a substrate. When the mirror is inserted into the socket, the mechanical connector and socket deform to provide a snap-fit assembly. Upon completion of assembly, the gripper is released from the flexure structure.

Beamsplitters may be in a shape of a cube or plate or other similar shape. When desired and or when appropriate (e.g., infrared applications), a silicon micro-machined beamsplitter may be provided because silicon itself has good reflection and transmission characteristic, such as in the infrared wavelength range. In one embodiment, a beamsplitter in the shape of a cube has dimensions at or about 1.5×1.5×1.5 mm³. In another embodiment, a beamsplitter in the shape of a cube has dimensions at or about 3×3×3 mm³

Figure 3A:
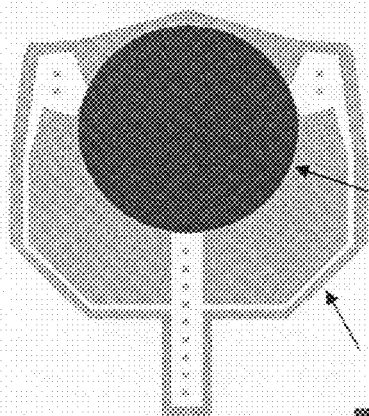
FIGS. 3A and 3B depict representative ball lens and assemblies using a microfixture (A) in schematic and (B) as assembled.
Figure 3B:
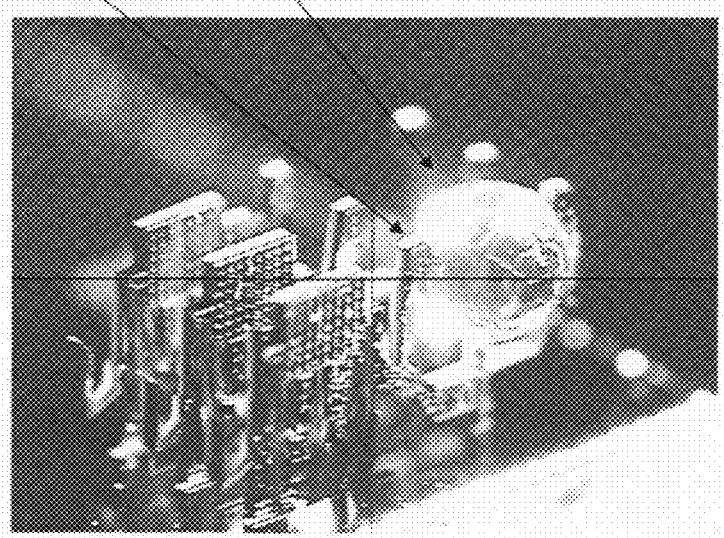

Micro ball lenses are used for collimation of an output signal of a laser diode. The ball lens also collimates incoming light when a device as described herein is integrated with a diverging light source, such as a fiber light source. A ball lens 310 having a micro fixture 320 is depicted in schematic in FIGS. 3A and 3B. The microfixture is a flexure structure designed to hold a 3-dimensional object such as sphere. The microfixture described enables assembly of a heterogeneous microoptical system that is not constrained by material and fabrication choices. As such, a variety of shapes (e.g., sphere, cube, and plate) and materials (e.g., glass, polymer and metal) may be suitably mounted on the optical bench of a device described herein.

Devices described include a scanning mirror mechanism using an actuator. In one embodiment, the displacement of the actuator is a function of the conductivity of the material (in many examples, silicon) and its mechanical stiffness. The inventors have further found that conductivity of an etched side wall and/or the top surface of the substrate when silicon, for example, improves with doping after DRIE; hence, doping significantly increased conductivity. A number of features were found that may be added and/or modified as desired (or when appropriate), such as a longer stroke of a scanning stage, one or more embedded positional sensors, and/or precision alignment of mirrors.

Accordingly, an optical bench is provided as a substrate for embedding scanning mechanisms and/or sockets and for adding and assembling one or more optical components. Connector or assembly sockets are specifically placed in position and identify locations for separate optical component by a pick and place assembly process. The optical bench is generally micro-machined.

Optical components are generally assembled from microparts and include one or more light sources, detectors, mirrors, beam splitters, ball lens, and combinations thereof. Preferably, optical components are provided to the optical bench by snap fitting into connector sockets. To simplify snap fitting, preferably an optical component includes a flexure structure for snap fitting into a connector socket.

An optical bench will also include at least one actuator and lever mechanism. The actuator typically comprises one or more v-beam shaped structures, each v-beam shaped structure in contact with at least one lever mechanism and at least one actuation bar. The actuator may further comprise a comb structure for measuring capacitance and/or for position sensing. The actuator increases driving force and eliminates rotational motion of the moving stage. The actuator, such as an electrothermal actuator, is used to drive scanning motion of the miniature device. A lever mechanism is used to amplify scanning stroke. As such, the moving stage is driven by an actuator.

The moving stage is typically combined with one or more optical components to create an interferogram upon transmission of light from a light source. The recorded interferogram is converted to a spectrum by numerical Fourier transform with respect to an optical path difference.

Fabrication of devices described herein combines silicon micromachining and microassembly techniques. One or more mirrors are micro-machined and assembled on the optical bench. Mirrors may be provided (e.g., manipulated and assembled) by a microgripper. Preferably, the optical bench includes silicon structures having a mechanical connecting mechanism.

Fabrication of devices in miniature as described herein preferably includes providing at least one deep reactive ion etching structure on at least one surface of a silicon substrate to form an optical bench, in which the optical bench preferably includes a moving stage, at least one actuator, one or more connector sockets and one or more optical components. The actuator is fabricated by deep reactive ion etching and preferably includes at least one v-beam shaped structure, actuator bar and lever mechanism. An actuator may include two working in symmetry.

Figure 4:
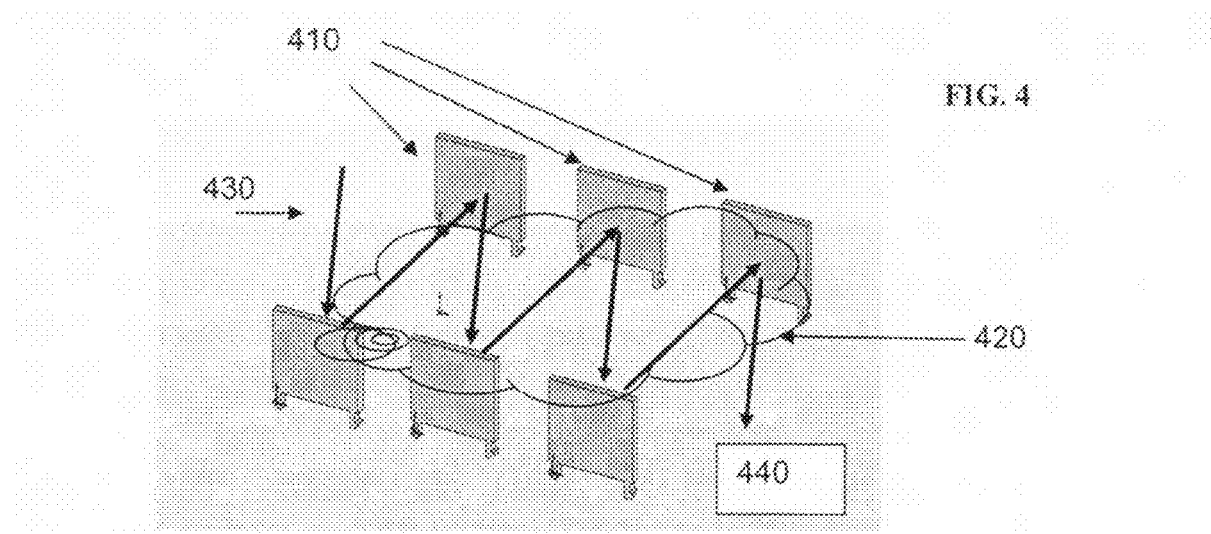
FIG. 4 depicts a schematic for a micro mirror array to extend light transmission path for a gas analyzer application.

In other embodiments, a device as described herein may be fabricated for detection and/or analysis of gas or a gas mixture using a mirror array. As depicted in FIG. 4, incoming light is positioned to a mirror array 410 that is microassembled using suitably located sockets on an optical bench of a substrate, such as silicon. The light may be from any suitable light source, such as an infrared light source (particularly useful because most gases present a unique absorption peak in the infrared wavelength range). Collimated light 430 is reflected from each mirror and passes through a gas (or gas mixture) 420 to be detected by a detector 440. By increasing light path length, hence absorption, a microspectrometer's sensitivity to gas is increased.

Figure 5:
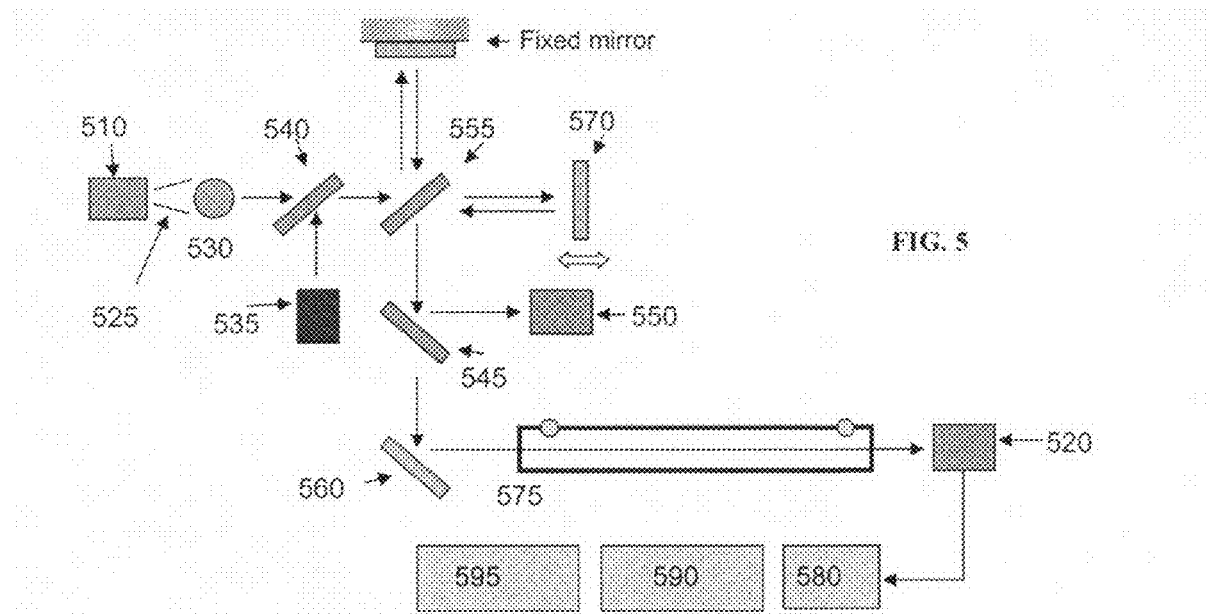
FIG. 5 depicts a system and configuration for a device for gas detection and analysis (micro-FTIR)

FIG. 5 shows a system configuration of a microspectrometer described herein for gas detection and/or analysis (e.g., gas chromatography). An infrared light source 510 and detector 520 are suitable micropositioned on an optical bench. Diverging light 525 is collimated by microlens 530 which is aligned and assembled by an invented microfixture. An additional laser diode 535 may optionally be included with the system using one or more cold mirrors 540 and 545. When used, a laser diode beam may serve as a position sensing reference. A first detector 550 detects interference of the laser diode laser beam. By counting fringes and analyzing sinusoidal waves, an accurate position of scanning mirror 570 is measured. Interfered light coming out of beamsplitter 555 is reflected by an additional mirror 560 and goes through a light pipe 575. The light pipe is preferably where sample gases are prepared, and a mirror array (such as that described with FIG. 4) may be positioned here. A detector 520 samples light coming out of light pipe 575. Sampled signals are Fourier transformed with the measured positional data of scanning mirror 570 for analysis via a DSP 580, electronics 590 and computer 595.

Figure 6:
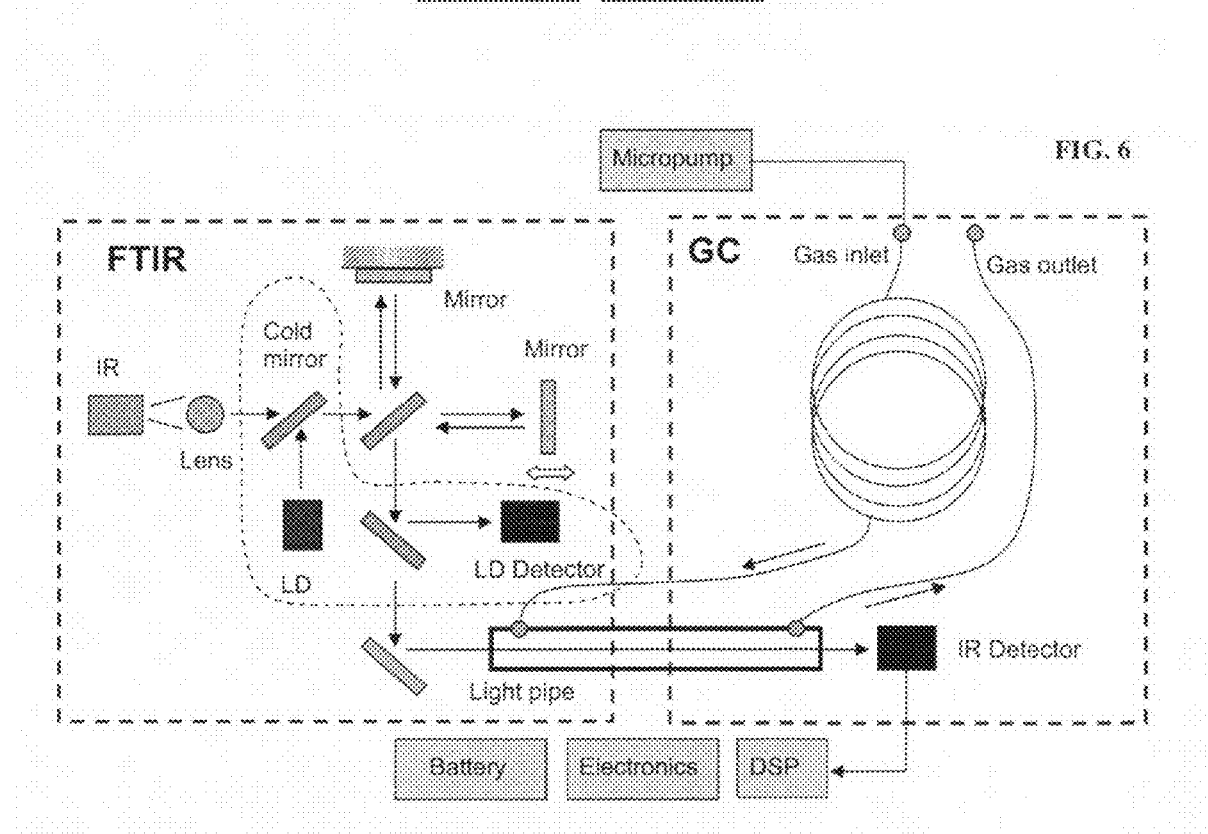
FIG. 6 depicts a system and configuration for a micro Fourier transform infrared spectroscopy (FTIR) with micro gas chromatography.

FIG. 6 is yet another example of a system configuration design for a gas chromatography device in miniature. LD is a laser diode beam configured similar to the design of FIG. 5.

Figure 7:
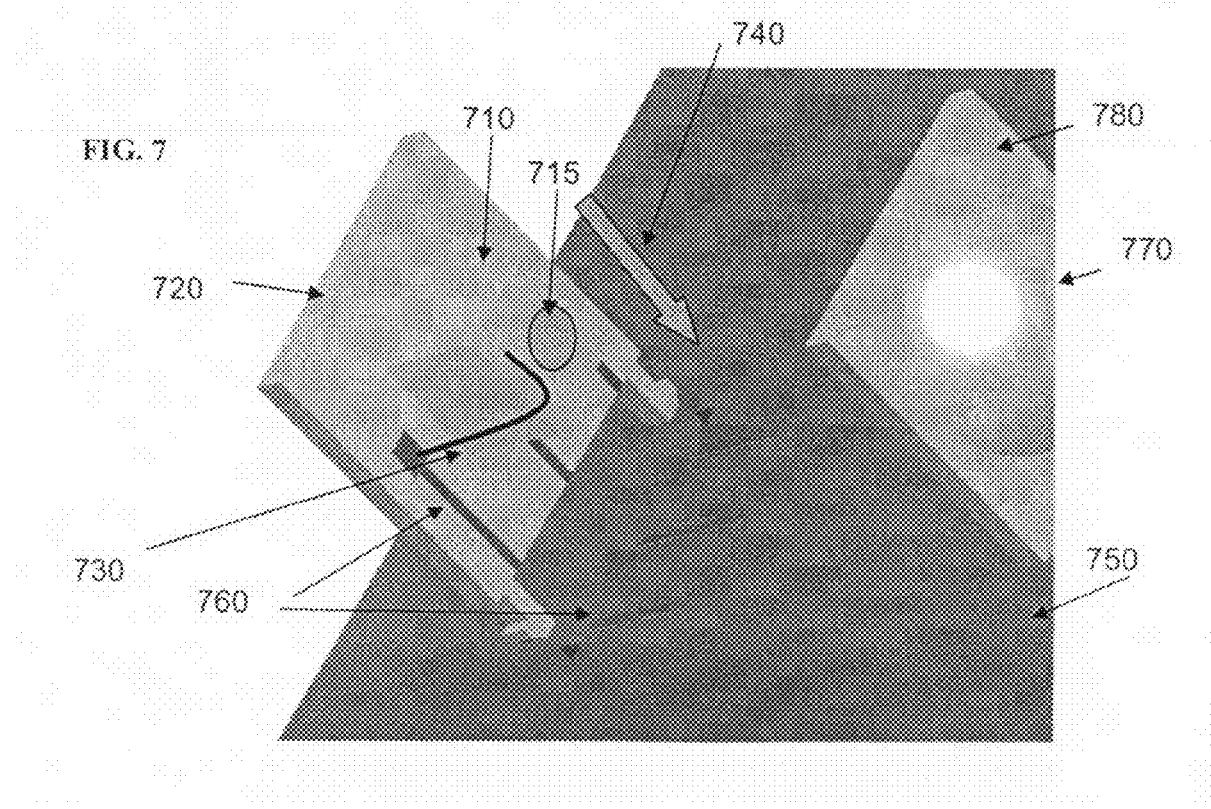
FIG. 7 depicts microassembly of active components using a micro board.

FIG. 7 depicts an example of a microassembly of active components (e.g., light source or detector) for a device in miniature as described herein using a micro board. An active component 710 (e.g., detector chip) with a sensitive area 715 is first die-bonded to a micro board 720, followed by wire bonding using wire 730 and then the functional micro board is pick and place assembled (see large arrow 740) to substrate 750. An electrical path 760 is formed between the micro board and the substrate. The micro board is optionally soldered to the substrate.

A interferometric device as described herein was fabricated using micro-parts, snap connectors and pick and place assembly. Assembly and packaging began with forming a DRIE processed microoptical bench on a 1 cm² silicon die bonded to a ceramic package. Either epoxy or solder could be used as the bonding material. Electrical pads on the microoptical bench were then interconnected by wirebonding to the electrical lead array of the ceramic package. Mirrors and lens fixtures were assembled using snap-fit flexure structures, and mating joints were reinforced by applying a small amount of epoxy. The beamsplitter was in the shape of a cube having dimensions of about 1.5×1.5×1.5 mm³. Mirrors included a scanning mirror and fixed mirror positioned on two sides of the beamsplitter cube. A ball lens was pick and place assembled into a lens fixture by using a snap-fit flexure structure and positioned on a third side of the beamsplitter cube. Joints of the ball lens were reinforced by applying small amount of epoxy. A laser diode and detector chips were also assembled on the microoptical bench using chip fixtures. One detector chip was positioned on the fourth side of the beamsplitter cube.

Figure 8:
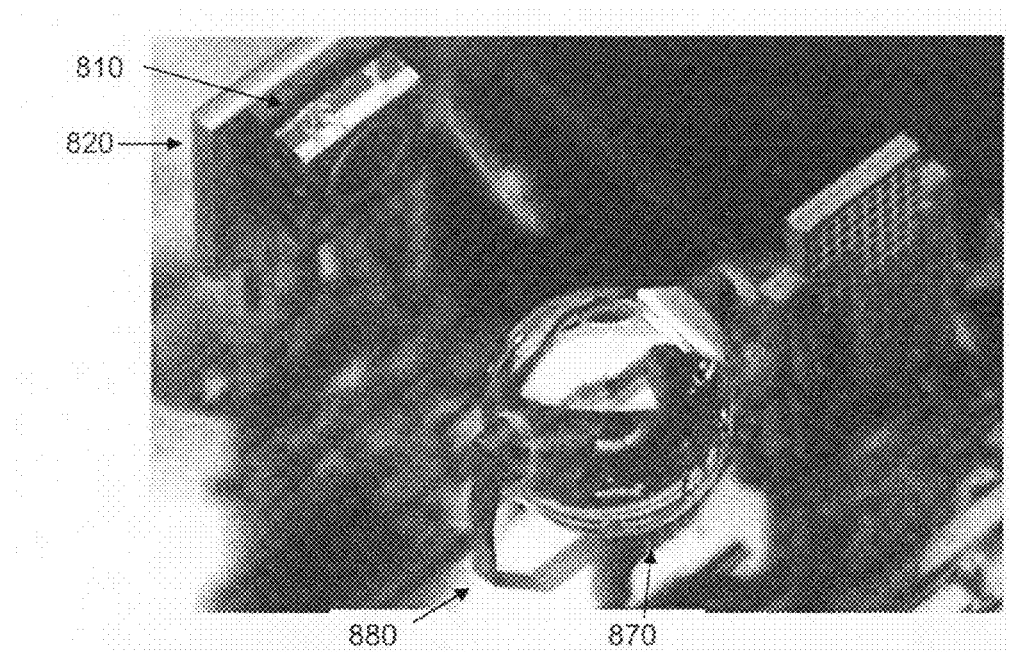
FIG. 8 depicts microassembly of a detector chip on a microoptical bench.

A second detector chip was aligned with the ball lens at an elevated height off the substrate allowing for 3-dimensional structure. The detector chip was assembled on a chip fixture by dispensing small amount of epoxy. The chip fixture had patterned electrical paths that allowed wirebonding from the detector chip to the fixture. Each detector assembly was picked and placed on the microoptical bench. Conductive epoxy or soldering was used for reinforcement and electrically interconnected the joint of the fixture with the microoptical bench. As described, such an assembly process allowed the detector chip to be properly alignment with the lens at an elevated height above the surface of the substrate. Examples of detector chip assemblies are shown in FIGS. 7 and 8 showing chip fixtures 720 and 820, detector chips 710 and 810, ball lens 770 and 870 and lens fixtures 780 and 880.

Figure 9:
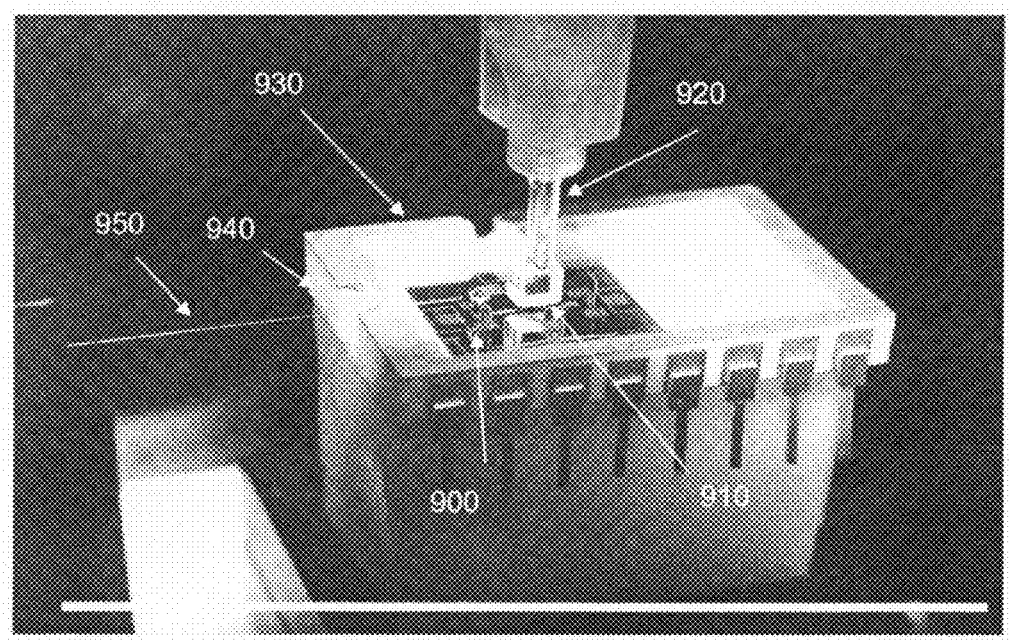
FIG. 9 illustrates a representative beamsplitter assembly process.

FIG. 9 shows a representative beamsplitter assembly process. A pneumatic nozzle 920 was used to pick and place beamsplitter 910 onto microoptical bench 900 in a ceramic package 930. The ceramic package as depicted in FIG. 9 had a machined feedthrough 940. The feedthrough was used to assemble one or more optical fibers depicted as fiber 950. Such a design provides for a device having application as a fiber coupled interferometer.

Characterization of a fabricated optical device was performed using another assembled miniature spectrometer with mirrors and beamsplitters. A microassembly technique as described was used to fabricate a representative miniature Michelson interferometer based on a Fourier transform spectrometer. Micromirrors, a ball lens, and beam splitter were assembled onto a silicon micromachined optical bench that had a scanning stage, sockets, and fixtures. The dimension of the die was 1×1 cm². The beamsplitter was a commercially available one with a dimension of 3×3×3 mm³. The tilt angles of the two assembled mirrors were measured and ranged from −1.6° and 2.9° toward the beamsplitter. The dimension of the optical bench was 1 cm²; its embedded thermal actuator had a couple of V-beam structures whose beam length was 1 mm. The mirrors were DRIE micromachined structures with a reflection area of 1×1 mm² and 750 µm long flexure structures for pick and place assembly.

Figure 10A:
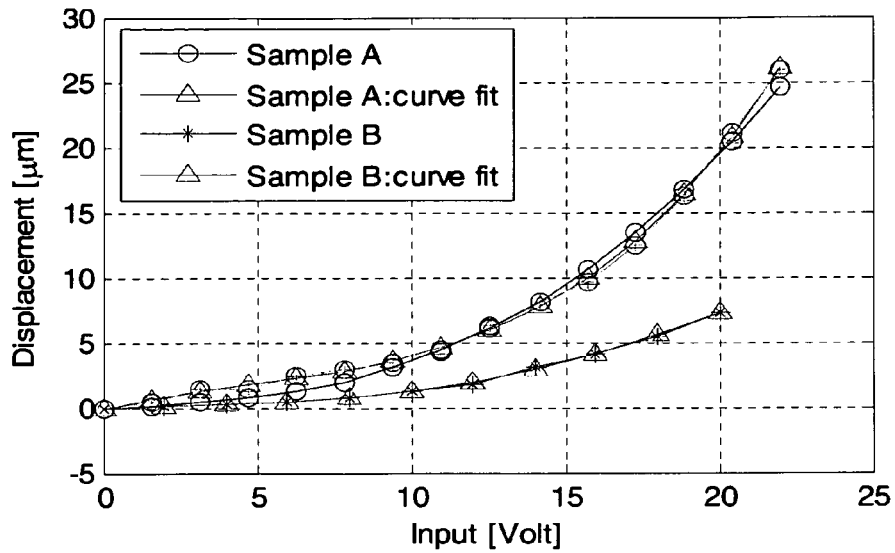
FIGS. 10A-10C depict response characteristics of a microspectrometer described herein, in which (A) is amplitude response of an electrothermal driven microstage showing displacement and (B, C) are dynamic characteristics showing frequency responses.

Static and dynamic responses of the scanning mirror mechanism were measured using a high speed machine vision system. FIG. 10A shows a displacement profile of a moving mechanism when input voltage was applied. The displacement of the actuator is the function of the conductivity of silicon and the mechanical stiffness. Doping after DRIE improved the conductivity of an etched side wall in addition to the wafer top surface. Doping was found to significantly increase the conductivity. In FIG. 10, one embodiment included a scanning mechanism that was doped only on the top surface, hence it showed a smaller displacement as compared with a sample that had been doped after etching. A curve fitting method with forth order polynomial equation was applied to estimate the displacement. RMS error and standard deviation of the curve fitting were found to be 67 nm and 100 nm respectively as shown in FIG. 10A.

Figure 10B:
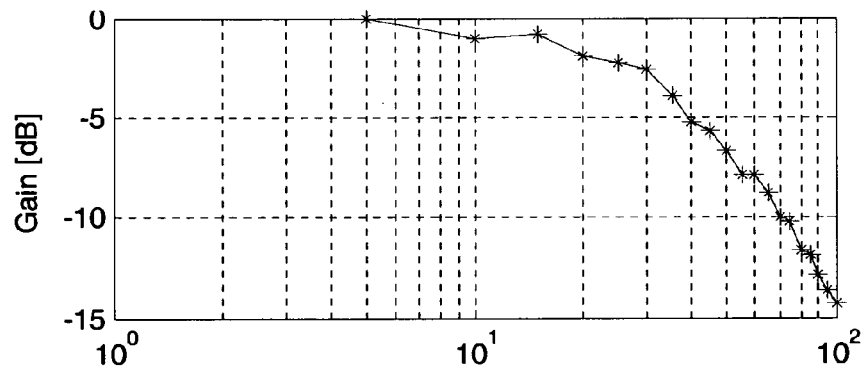
Figure 10C:
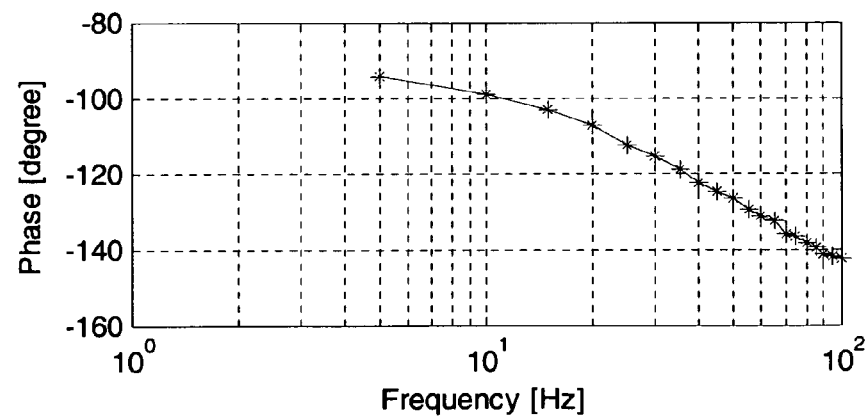

FIGS. 10B and 10C illustrate dynamic frequency responses of the scanning mirror mechanism. FIG. 10B showing the gain and FIG. 10C showing the phase response. In practice, the natural frequency of the structure itself was on the order of several KHz. Because thermal heating and cooling processes are much slower than elastic deformation, a cutoff frequency was found to be about 30 Hz.

Figure 11A:
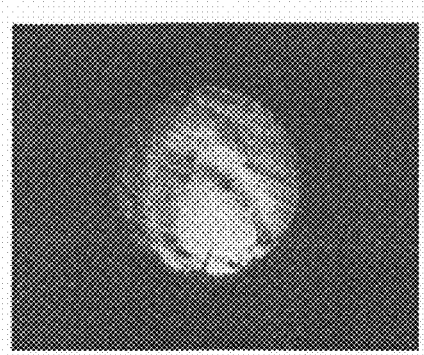
FIGS. 11A-11C depict fringe pattern formations with diverging light input of an assembled mirror as described herein.
Figure 11B:
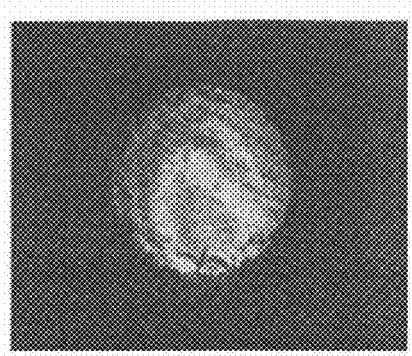
Figure 11C:

With the microspectrometer described, a He—Ne laser was used as a light source to create an interferogram. A lens was used to make the collimated beam diverge, and a stripe shaped fringe pattern as evidenced in FIGS. 11A-11C were obtained at the common boundary of the two beams.

Figure 12:
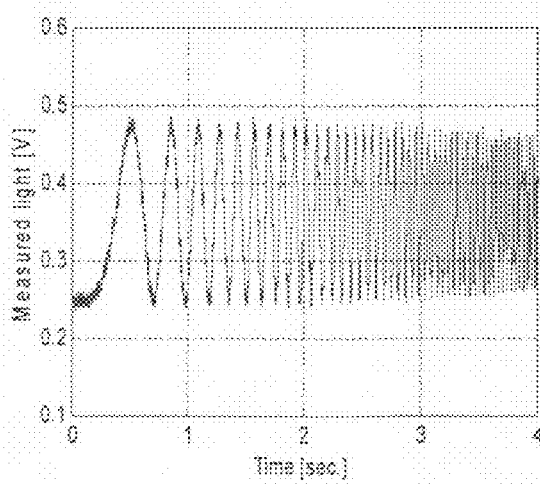
FIG. 12 depicts an interferogram as a light power measurement of fringe pattern during scanning motion relying on a He—Ne laser light source with sinusoidal voltage input.
Figure 13:
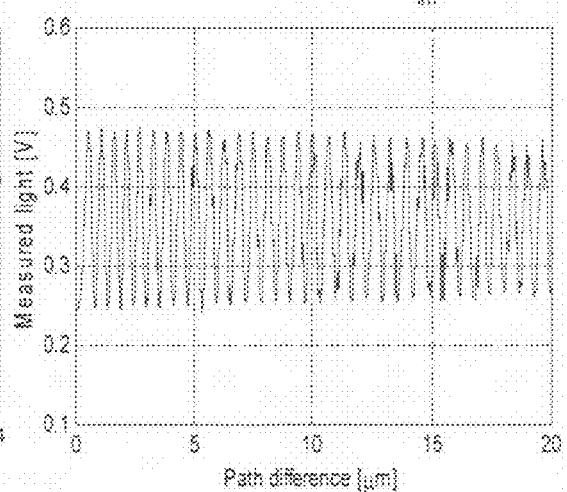
FIG. 13 depicts regeneration of an interferogram as a reconstructed signal from a 1 KHz sampled signal.

Sinusoidal voltage input was applied to the scanning mechanism described at a frequency of 0.1 Hz and an amplitude of 22V. An interferogram was measured using a detector focused at one of the patterns. FIG. 12 shows the measurement after low pass filtering and normalization. Due to the nonlinear characteristics of the response and the sinusoidal input, the time based measurement was re-sampled for displacement-based measurement as shown in FIG. 13 after reconstruction from a 1 KHz sampled signal and showed a 100 nm sampled signal.

Figure 14:
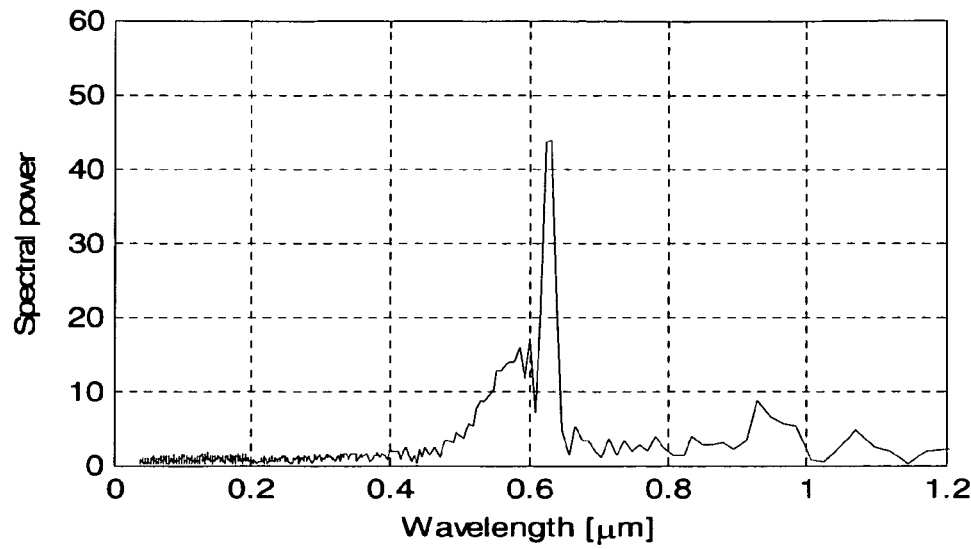
FIG. 14 depicts a light spectrum from a He—Ne laser described herein.

The Fourier transform of the interferogram is shown in FIG. 14. The spectrum peak was at 632 nm with a 25 nm full width half magnitude (FWHM). Together, the examples show that a longer stroke of the scanning stage, an embedded position sensor, and precise alignment of mirrors may each contribute to efficiency of the spectrometer.

Figure 15:
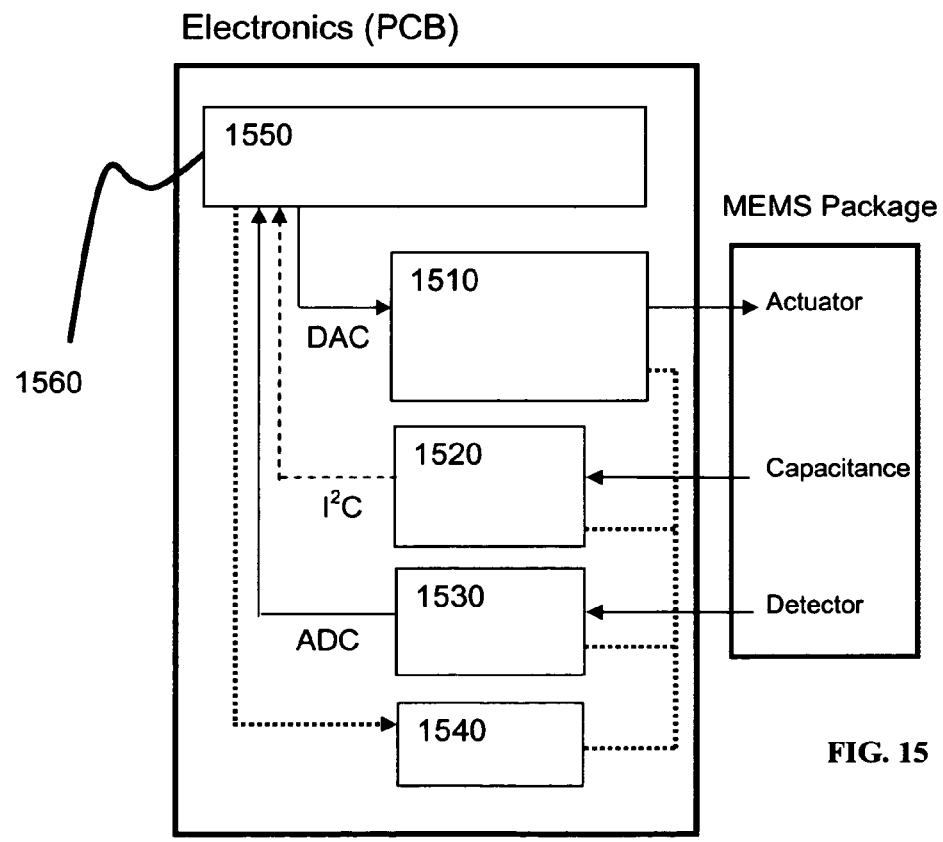
FIG. 15 depicts a schematic of representative electronics included with one or more devices described herein.

FIG. 15 illustrates a functional diagram with various spectrometer electronics for a device in miniature as described herein. Modules may include all or many of those identified in FIG. 14, such as: (a) 1510 representing a power amplifier (e.g., transistor/OP logic), (b) 1520 representing a capacitance measurement circuit for position sensing, (c) 1530 as a detector circuit (e.g., including a filter and amplifier) and/or a communication circuit; (d) 1540 as a voltage regulator and (d) 1550 as a microcontroller circuit. Typically, microcontroller module 1550 is operable and communicates with a hardware/software module 1560 to transport measured data from the microspectrometer in a computer readable form and/or to provide one or more controls to the microspectrometer, such as by sending actuation commands to power amplifier module 1510, a recording light power signal from detector module 1530 and/or recording capacitance from capacitance module 1520. A power amplifier module 1510 is used to amplify current for a scanning actuator using energy sources, including but not limited to batteries or a USB port. A detector module 1530 may include a light detector and a low pass filter. A voltage regulator module 1540 supplies necessary voltage for each functional module.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed:

1. A device in miniature, the device comprising:
   a substrate;
   an optical bench on the substrate, the optical bench comprising:
      one or more actuators;
      a moving stage driven by at least one of the actuators;
      a first connector socket with a fixed position relative to the substrate;
      a second connector socket on the moving stage;
      a first optical component coupled to the first connector socket, such that the first optical component is fixed relative to the substrate; and
      a second optical component coupled to the second connector socket, such that the second optical component moves with the moving stage, relative to the substrate;
   wherein at least one of the actuators comprises a scanning mechanism comprising at least one elongated rib comprising:
      a top surface;
      at least one side wall formed at least in part by deep reactive ion etching (DRIE);
      dopant in the top surface of the rib; and
      dopant in the side wall of the rib in an amount sufficient to increase conductivity of the rib, relative to a rib without a doped top surface and a doped side wall.

2. The device of claim 1, wherein:
   the scanning mechanism comprises an actuation bar and at least one pair of elongated ribs coupled to the actuation bar, with the ribs of the pair positioned on opposite sides of the actuation bar to form a v-shaped structure with an apex, with the actuator bar at the apex; and
   the device comprises a lever mechanism coupled between the actuation bar and the moving stage, the lever mechanism configured to translate movement of the actuator bar into longer movement of the moving stage.

3. The device of claim 1, wherein the optical bench comprises:
   two lever mechanisms coupled to the moving stage; and
   two actuators, each coupled to one of the lever mechanisms;
   wherein the two lever mechanisms and the two actuators form a symmetric structure with two sides, each side comprising one of the lever mechanisms and one of the actuators.

4. The device of claim 1, wherein the second optical component comprises a mirror mounted to the second connector socket.

5. The device of claim 1, wherein substrate comprises a silicon on insulator wafer.

6. The device of claim 1, wherein the optical bench comprises three or more different types of optical components from the group consisting of: a light source, a light detector, a mirror, a beam splitter, a ball lens, and combinations thereof.

7. The device of claim 1, wherein the at least one of the actuators comprises one or more v-beam shaped structures, each v-beam shaped structure having at least one actuation bar in contact with at least one lever mechanism.

8. The device of claim 1, wherein the moving stage comprises a comb structure for measuring capacitance and for position sensing.

9. The device of claim 1, wherein a vertical side wall at the end of the actuator is used as a mirror surface.

10. The device of claim 1, wherein some of the optical components include flexure structures as mechanical connectors.

11. A device according to claim 1, wherein:
    the moving stage comprises a scanning stage;
    the optical bench comprises:
       a silicon micromachined optical bench with the scanning stage and with sockets for placement of optical components; and
       fixtures with optical components in the sockets;
    the device is operable as a miniature Michelson interferometer; and
    the optical components in the fixtures comprise a ball lens and a beam splitter.

12. The microassembled device of claim 11, wherein the device has a spectrum range determined by the applied light source and detector, the light source selected from the group consisting of ultraviolet, visible, near infrared and infrared.

13. The microassembled device of claim 11, wherein the device includes a light pipe and a mirror away used to extend a light path and increase absorption of light, wherein the mirror array comprises:
    a first substantially longitudinal bank of two or more mirrors in the light pipe; and
    a second substantially longitudinal bank of two or more mirrors in the light pipe, substantially opposite the first bank, with the mirrors in the first and second banks aimed so that light will bounce from a first mirror in the first bank to a first mirror in the second bank, and then from the first mirror in the second bank to a second mirror in the first bank.

14. The microassembled device of claim 11, wherein the device is operable to detect one or more gases and incorporates a gas chromatography unit that delivers separated gas.

15. A method for assembly of a device in miniature, the method comprising the steps of:
- fabricating an optical bench on a silicon substrate, the optical bench comprising:
  - a first connector socket with a fixed position relative to the substrate;
  - a moving stage driven by at least one of the actuators; and
  - a second connector socket on the moving stage;
- using deep reactive ion etching (DRIE) to fabricate one or more actuators for the optical bench, wherein at least one of the actuators comprises a scanning mechanism comprising at least one elongated rib comprising:
  - a top surface; and
  - at least one side wall formed at least in part by DRIE;
- after forming the at least one side wall, doping the top surface of the rib and the side wall of the rib with sufficient dopant to increase conductivity of the rib;
- force fitting a first optical component into the first connector socket, such that the first optical component is fixed relative to the substrate; and
- force fitting a second optical component into the second connector socket, such that the second optical component will move with the moving stage, relative to the substrate.

16. The method of claim 15, wherein the scanning mechanism comprises a v-beam shaped structure and an actuator bar to couple the v-beam shaped structure to a lever mechanism.

17. The method of claim 15, further comprising:
- bonding one or more optical components in place by gluing, soldering, or a combination thereof.

18. The method of claim 15, further comprising:
- adding at least one chip fixture to the optical bench, wherein the chip fixture comprises a pattern of electrical paths and a detector chip wirebonded to at least one of the electrical paths.

* * * * *